United States Patent [19]
Mao et al.

[11] 3,821,132
[45] June 28, 1974

[54] POLYURETHANE FOAMS AND METHOD OF MAKING SAME
[75] Inventors: Chung-Ling Mao, Sandy Hook; Lynn A. Bakker, Derby; John R. Robertson, Newtown, all of Conn.
[73] Assignee: Uniroyal, Inc., New York, N.Y.
[22] Filed: Feb. 28, 1973
[21] Appl. No.: 336,842

[52] U.S. Cl............... 260/2.5 AM, 260/2.5 AP, 260/77.5 AQ, 260/268 FT
[51] Int. Cl................ C08g 22/08, C08g 22/46
[58] Field of Search.. 260/268 FT, 268 BC, 2.5 AQ, 260/2.5 AM, 77.5 AQ

[56] References Cited
UNITED STATES PATENTS

| 3,251,788 | 5/1966 | Currier | 260/2.5 AQ |
| 3,257,339 | 6/1966 | Hostettler | 260/2.5 AQ |
| 3,306,912 | 2/1967 | Fritz | 260/268 FT |
| 3,661,860 | 5/1972 | Schwarz | 260/2.5 AQ |

Primary Examiner—Donald E. Czaja
Assistant Examiner—C. Warren Ivy
Attorney, Agent, or Firm—Robert J. Patterson, Esq.

[57] ABSTRACT

High resiliency polyurethane foams are made by the so-called "one-shot" process by reacting a polyalkylene polyether polyol with an organic polyisocyanate and a chain extender which comprises a major amount of a 1,4-dialkanol of an octahydrothieno[3,4-b]pyrazine 6,6-dioxide and a minor amount of a monoalkanol of an octahydrothieno[3,4-b]pyrazine 6,6-dioxide.

16 Claims, No Drawings

POLYURETHANE FOAMS AND METHOD OF MAKING SAME

CROSS-REFERENCE TO RELATED APPLICATIONS

Copending application Ser. No. 336,590, filed of even date herewith in the names of Nudenberg, Hagen, Little and Mao relates to new chemical compounds including those used as chain extenders in the present invention, and use of such compounds in the production of polyurethanes. Copending application Ser. No. 336,752, also filed of even date herewith in the name of Hagen relates to new octahydrothieno[3,4-b]pyrazine 6,6-dioxides which when reacted with an epoxide yield new chemical compounds of the kind employed in the instant invention.

FIELD OF THE INVENTION

The field of the invention comprises new polyurethane foams made with a chain extender comprising in combination a 1,4-dialkanol of an octahydrothieno[3,4-b]-pyrazine 6,6-dioxide and a monoalkanol of an octahydrothieno[3,4-b]pyrazine 6,6-dioxide.

DESCRIPTION OF THE PRIOR ART

It is well known that polyether-polyol-polyisocyanate foams can be made by reacting a non-linear slightly branched polyether glycol or polyol, a diisocyanate, and a polyfunctional chain extender which is an organic compound having two or more reactive hydrogen atoms (as determined by the well-known Zerewitinoff method) such as alkylene diols (1,4-butanediol, 1,5-pentanediol, propylene ether glycol), alkylene or arylene diamines. Similarly, it is possible to use a linear ether glycol, a mixture of di- and triisocyanates with a chain extender. Under anhydrous conditions the resulting polyurethane is non-porous. In the presence of an excess of isocyanate and water, the water reacts with the isocyanate group to form carbon dioxide which is entrapped in the reaction mixture and the resulting polyurethane is porous or cellular. Thus the diisocyanate functions to react with the diol and chain extender to build up the polyether polyol to a high molecular weight, to crosslink the polymeric system and to provide the necessary carbon dioxide. An auxiliary mechanical or physical (as distinguished from chemical) blowing agent, such as a fluorocarbon, may also be employed. The gelling time of the reaction mixture is commonly controlled preferably to be slightly longer than the rise time, so that the solidifying mass entraps therewithin the carbon dioxide or other gas thereby giving a foamed product. It is normal practice to control the gas forming reaction by the use of catalysts or activators. The most common of these are amines, typically tertiary amines such as N-ethyl morpholine. These catalysts may also serve to catalyze the gelling reaction.

By the proper control of the gas forming reaction and the gelation reaction it is possible to form a foamed polyurethane by the so-called "one-shot" method, in which all the ingredients are mixed together at room temperature. Under commercial conditions the desired foam rise time should be about 70-120 seconds, typically 90 seconds. Similarly, the gel time should be at least as long as the rise time. For successful commercial operation the gel time should be about 70-130 seconds, preferably 110 seconds. Obviously the gel time must be sufficiently long to permit the fullest development of the foaming reaction.

SUMMARY OF THE INVENTION

The present invention relates to high resiliency polyether polyurethane foams made from the reaction products of a polyalkylene polyether having a hydroxylic functionality of at least two, an organic polyisocyanate and a chain extender consisting of a mixture of a major amount of a 1,4-dialkanol of an octahydrothieno[3,4-b]pyrazine 6,6-dioxide and a minor amount of a monoalkanol of an octahydrothieno[3,4-b]pyrazine 6,6-dioxide. These high resiliency foams made by the "one-shot" method are characterized by a unique combination of physical properties such as high tensile strength, high tear resistance and excellent "sag" factor. The "sag" factor in this context is defined as the ratio of the 65 percent standard indentation load deflection to the 25 percent indentation load deflection. To qualify as a high resiliency foam, the "sag" factor must measure at 2.8 or better. High resiliency foams find utility as automobile and furniture cushioning materials, pillows, mattresses and carpet underlays.

DESCRIPTION OF THE PREFERRED EMBODIMENTS

This invention relates to the preparation of polyalkylene-polyol-based polyurethanes and more specifically to novel chain extenders which are particularly useful in preparing high resiliency, flexible foams by the so-called "one-shot" process. As is well-known in the polyurethane foam art, in the "one-shot" process all of the various components are simultaneously mixed together at room temperature and the polymer-building step is not given a start as in the "prepolymer process." As a consequence, in the "one-shot" process it is critically important that a balance be achieved between the various reactions in order to obtain a maximum yield of foam product of highest quality.

It is an object of this invention to provide a novel mixture of polyfunctional low molecular weight compounds which not only function as chain extenders but also act to catalyze the gas forming reaction and the gelation reaction.

The physical properties of the foams of this invention are characterized by high tensile strength, high tear resistance and excellent "sag" factor. This unique combination of physical properties is largely determined by the novel chain extenders which are mixtures of a minor amount of a monoalkanol (Type I) and a major amount of a dialkanol (Type II) of octahydrothieno[3,4-b]pyrazine 6,6-dioxide having the general formulae:

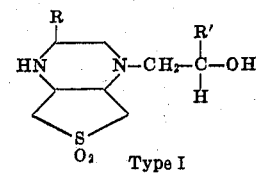

Type I

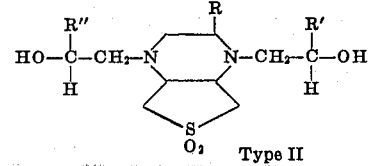

Type II where R, R' and R'' may be the same or different and represent a hydrogen atom or a lower alkyl group having 1 to 8 carbon atoms. The Type I compounds are aminoalcohols and are useful as chain extenders using the "two-shot" method in which a prepolymer is first made by reacting excess polyisocyanate with a polyalkylene polyol (step 1) and then reacted with the chain extender and catalyst (step 2). Because of their highly basic character, the Type I compounds cause premature gelling of a foam-forming polyurethane reaction mixture and hence cannot be used in the conventional "one-shot" process for making high resiliency foams.

The Type II compounds are diols and are much less basic than the Type I compounds and are useful as chain extenders for making polyurethane elastomers by either the "one-shot" or "two-shot" methods. However, the Type II compounds are not suitable for making high resiliency polyurethane foams by the "one-shot" method because they are not basic enough to provide the proper rate of chain extension and cross-linking. However, unexpectedly it has been discovered that high resiliency foamed structures having a unique combination of properties can be made using mixtures of a major amount of a Type II compound and a minor amount of a Type I compound as chain extenders by the "one-shot" method. The mole ratio of Type II compound to Type I compound can vary from 1.5:1 to 9:1 with a preferred ratio of from 2:1 to 4.5:1 and an even more preferred ratio of about 4:1.

A variety of organic polyfunctional isocyanates, i.e., organic polyisocyanates may be used in the process of the present invention although diisocyanates are preferred in many formulations. Suitable polyfunctional isocyanates include alkylene diisocyanates such as hexamethylene diisocyanate and decamethylene diisocyanate, arylene diisocyanates such as phenylene diisocyanates, tolylene diisocyanates, naphthalene diisocyanates, 4,4'-diphenylmethane diisocyanates, or isomers or mixtures of any of these. Triisocyanates typically obtained by the reaction of three moles of an arylene diisocyanate with one mole of a triol — for example, the reaction product formed from three moles of tolylene diisocyanate and one mole of hexanetriol or of trimethylol propane, may be employed. A preferred polyisocyanate is the mixture of 80 percent 2,4-tolylene diisocyanate and 20 percent 2,6-tolylene diisocyanate.

The substances having two or more active hydrogen atoms (as determined by the Zerewitinoff method), e.g., the polyalkylene polyols, which may be employed in practice of the invention will be organic compounds having two or more reactive hydrogen atoms which will react with organic polyfunctional isocyanates to give urethane polymers. These polyalkylene polyols, typically having a molecular weight of about 180 to 8,000, may include polyesters, polyethers, polyisocyanate modified polyesters, polyisocyanate modified polyester amides, alkylene glycols, polymercaptans, polyamines, polyisocyanate modified alkylene glycols, etc. It will be understood that these polyalkylene polyols may have active primary or secondary hydroxyl groups. The polyalkylene polyol may be a hydroxyl-containing polyether or polyester including fatty acid glycerides. Polyesters, which are a preferred type of polyalkylene polyol, may be obtained by esterification condensation reaction of e.g., an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oils, hydrogenated castor oil, or blown natural oils.

Examples of useful branch chain polyether polyols containing a plurality of functional hydroxyl terminal groups are the reaction products of glycerol, trimethylol propane, pentaerythritol, 1,2,6-hexane triol, phloroglucinol, trimethylol benzene, trimethylol phenol, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide and the like. Mixtures of the monomers forming the polyether polyols as well as the mixtures of the branched chain polyether polyols themselves may be used.

The branch chain polyether polyols have at least 3 functional hydroxyl radicals but may have up to 8 or more functional hydroxyl radicals.

Examples of linear or substantially linear polyether polyols are those polyalkylene ether glycols derived from alkylene oxides, glycols, heterocyclic ethers and other materials by polymerization, copolymerization and the like. For example tetrahydrofuran may be polymerized in the presence of catalytic amounts of fluoro sulfonic acid to make a polytetramethylene ether glycol having the formula:

$$HO(-CH_2CH_2CH_2CH_2O-)_xH$$

where $x$ is an integer. Ethylene oxide-propylene oxide mixtures, propylene oxide and the like may be used to make other polyalkylene ether glycols. Glycols may be polymerized in the presence of mineral acid, sulfonic acid or fuller's earth. Still other methods well known to the art may be used in the preparation of polyalkylene ether glycols.

These linear polyether polyols may be represented by the formula: $HO(-R-O-)_xH$, where R is an alkylene or aryl alkylene group and where x is an integer. Moreover, R can be a mixture of alkylene groups, for example, alternating groups or blocks of ethylene and propylene radicals, i.e., a polyethylene-propylene ether glycol, or a mixture of aryl alkylene groups, or a mixture of alkylene and aryl alkylene groups. Examples of substantially linear polyalkylene ether glycols are polyethylenepropylene ether glycol, polyneopentylene ether glycol, polytetramethylene ether glycol, polypentamethylene ether glycol, polyhexamethylene ether glycol, poly 4-phenyl hexamethylene ether glycol, poly 1,6-heptamethylene ether glycol and the like. To provide for water resistance the polyethers should have at least three carbon atoms between oxygen (ether) linkages. However, some of the carbon chains can consist of 2 carbon atoms so long as there are a predominating number of carbon chains having 3 or more carbon atoms. The average molecular weight of these polyethers may vary from about 180 to about 6,000 or more.

Formation of the preferred foamed products of this invention may be accomplished in a one-shot system by reacting the polyol with excess polyfunctional isocyanate in the presence of water and cell modifying agents, e.g., silicones such as trimethyl end-blocked dimethyl polysiloxanes. The polyfunctional isocyanate is typically present in amount of 5%–300%, say 40 percent by weight of the polyol. The water should be present in amount to react with the isocyanate to liberate sufficient gas to produce a foam of the desired physical characteristics. From 0.5 to 10 percent, say 4 percent water (by weight of polyol) will give good results.

The mixing of the constituents in the one-shot system is typically performed at room temperature. The polyol, chain extender, catalyst, water, flame retardant and other cell-modifying agents (surface active agents) such as trimethyl end-blocked dimethyl polysiloxanes are first mixed and then the polyisocyanate is added with vigorous stirring. The gas forming reaction, the chain extension and the cross linking reactions start simultaneously when the polyisocyanate is added.

Some examples of useful catalysts are N-methylmorpholine, N-ethylmorpholine, triethyl amine, triethylene diamine or 1,4-diaza(2,2,2)bicyclooctane ("Dabco" (trademark)), N,N'-bis(2-hydroxylpropyl)-2-methyl piperazine, dimethyl ethanol amine, tertiary amino alcohols, tertiary ester amines and the like.

The Type I and Type II compounds which are used in admixture to make the high resiliency polyurethane foams of this invention are made using the procedure given in copending application of Nudenberg, Hagen, Little and Mao Ser. No. 336,590 filed of even date herewith. The method of that application comprises reacting a 3,4-dihalotetrahydrothiophene 1,1-dioxide having the formula

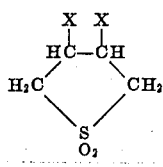

wherein X is halogen, with an alkylene diamine having the formula:

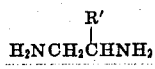

wherein R' is a hydrogen atom or an alkyl group having 1 to 10 carbon atoms, and thereby forming a product having the formula:

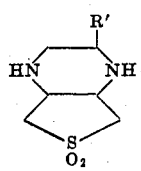

, and reacting the last-named product with an epoxide.

A procedure which directly produces a mixture of Type I and Type II in the desired mole ratio involves reacting the octahydrothieno[3,4-b]pyrazine 6,6-dioxide with the appropriate amount of alkylene oxide according to the following reaction scheme:

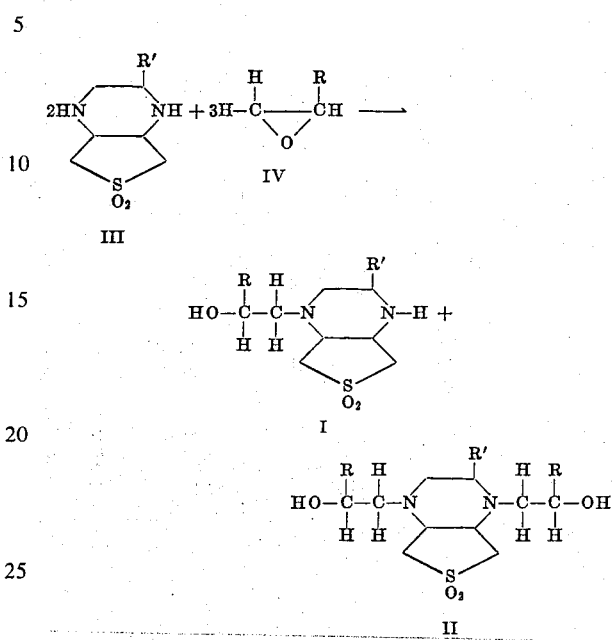

The mole ratio of the 1,4-dialkanol of the octahydrothieno[3,4-b]pyrazine 6,6-dioxide to the monoalkanol of the octahydrothieno[3,4-b]pyrazine 6,6-dioxide in the reaction mixture is controlled by controlling the mole ratio of the alkylene oxide (IV) to the octahydrothieno[3,4-b]pyrazine 6,6-dioxide (III). Generally about one mole of the dioxide (III) is reacted with from 1.7 to 1.9 moles of alkylene oxide (IV) in water as a solvent. Aliphatic or cycloaliphatic alcoholwater mixtures may also be used as reaction solvents in lieu of water. Examples of suitable alcohols include methanol, ethanol, propanol, isopropanol, butanol, pentanol, hexanol and cyclohexanol. The reaction temperature is not critical and the exotherm may be controlled by either the rate of addition of alkylene oxide or by external cooling in order to avoid any loss of alkylene oxide vapor. This can be accomplished by running the reaction in a closed system such as a pressure reactor or using a solid carbon dioxide-cooled condenser.

Any epoxide wherein the epoxy group is an oxirane group is suitable to prepare the chain extenders of this invention. Outstanding results are obtained with ethylene oxide and monosubstituted ethylene oxides having the formula

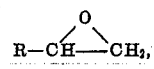

where R is a hydrocarbon radical such as alkyl with 1 to 8 carbon atoms, aryl, alkyl substituted aryl or cycloalkyl. Exemplary of such epoxides are ethylene oxide, propylene oxide, 1-butene oxide, 2-butene oxides, 1-hexene oxide, 1-octene oxide and substituted alkylene oxides such as cyclohexene oxide, styrene oxide; glycidyl ethers, such as methyl glycidyl ether, ethyl glycidyl ether, hexyl glycidyl ether, phenyl glycidyl ether, o, m, or p-tolyl glycidyl ether, o, m, or p-chlorophenyl glycidyl ether; and unsaturated epoxides, such as vinyl cyclohexene monoxide, butadiene monoxide, methallyl glycidyl ether, o, m, p-allylphenyl glycidyl ether and allyl glycidyl ether. Halogencontaining epoxides may also be used. Exemplary of such halogen-containing epoxides are epichlorohydrin, epibromohydrin, epifluorohydrin, trifluoromethyl ethylene oxide. Also suitable are the acetal- and ketal-containing epoxides such as 1,1-dimethoxy-2,3-epoxypropane, 1,1-diethoxy-2,3-epoxypropane, 2-(2,3-epoxypropoxy)-tetrahydropyran; sulfone-containing epoxides such as 7-oxa-3-thiabicyclo[4.1.0]heptane-3,3-dioxide and nitrile-containing epoxides such as $\beta$-cyanoethyl glycidyl ether.

The novel cellular polyurethane compositions prepared in accordance with this invention can be prepared using the following conventional one-shot formulation for high resiliency foams, the novel chain extenders of the invention being incorporated with the other ingredients at the time when the formulation is mixed:

|  | | Parts |
|---|---|---|
| Polyol[1] | = | 100.0 |
| Chain extender[2] | = | 3–5.0 |
| Water | = | 2.5–4.0 |
| Fire retardant[3] | = | 3.0–5.0 |
| Amine Catalyst | | |
| "Dabco 33LV"[4] | = | 0.4–0.6 |
| NEM[5] | = | 1.0–0.0 |
| "Niax A-1"[6] | = | 0.2–0.0 |
| Organo tin[7] | = | 0.0–0.2 |
| Surface active agent[8] | = | 0.05–0.03 |
| Isocyanate compound[9] | = | 34–50.0 (105–110 Index) |

[1] "Voranol 4701" (trademark)(Dow Chemical) — Polypropylene glycol triol, molecular weight 4700, made from propylene oxide and end-capped with 20 to 80 percent ethylene oxide.
[2] Mixture of Type II/Type I Compound.
[3] "Firemaster T23P" (trademark); tris(2,3-dibromodipropyl)phosphate from Michigan Chemical Company.
[4] Trademark for 1,4-diazobicyclo[2.2.2.]octane.
[5] Abbreviation (not a trademark) for N-ethylmorpholine.
[6] Trademark for bis(2-dimethylaminoethyl) ether.
[7] Stannous octoate (T-9) (trademark).
[8] "DC 200" (trademark); dimethylpolysiloxane, viscosity 5 centistokes, from Dow Corning.
[9] Toluene diisocyanate (80% by weight, 2,4-isomer and 20% by weight 2,6-isomer), known as TDI (not a trademark).

EXAMPLE 1

The following example illustrates a typical preparation of a chain extender mixture useful for making the high resiliency foams of this invention:

To a 1,000 ml. three-necked round bottom flask equipped with a solid carbon dioxide-cooled condenser, a stirrer and an additional funnel were introduced 176 grams (1.0 mole) of 1,2,3,4,4a,5,7,7a-octahydrothieno[3,4-b]pyrazine 6,6-dioxide (III) and 400 ml. of water at room temperature. A solution of 104 grams (1.8 moles) of propylene oxide in 100 ml. of water was then added during a period of 60 minutes. The reaction mixture was kept at 30°–40° C. for 3 hours and at room temperature for an additional 3 hours. The solvent was then removed under reduced pressure to give a viscous liquid product. Calculated hydroxyl number, 403; found, 407. Infrared spectrum showed absorptions at 3,550 cm$^{-1}$ (OH), at 3,350 cm$^{-1}$ (NH), at 1,290 cm$^{-1}$ and 1,120 cm$^{-1}$ (SO$_2$) and at 1,050 cm$^{-1}$ (C-O).

Thus this reaction mixture contained 80 mole percent of the 1,2,3,4,4a,5,7,7a-octahydrothieno[3,4-b]pyrazine-1,4-bis($\alpha$-methylethanol) 6,6-dioxide and 20 mole percent of the 1,2,3,4,4a,5,7,7a-octahydrothieno[3,4-b]pyrazine-1-($\alpha$-methylethanol) 6,6-dioxide.

EXAMPLE 2

Example No. 1 was repeated using 1,2,3,4,4a,5,7,7a-octahydro-2-methylthieno[3,4-b]pyrazine 6,6-dioxide as diamine. The resultant product, a mixture of 80 mole percent of 1,2,3,4,4a,5,7,7a-octahydro-2-methylthieno[3,4-b]pyrazine-1,4-bis($\alpha$-methylethanol) 6,6-dioxide and 20 mole percent of 1,2,3,4,4a,5,7,7a-octahydro-2-methylthieno[3,4-b]pyrazine-1-($\alpha$-methylethanol) 6,6-dioxide was obtained as a viscous liquid. IR showed absorptions at 3,550 cm$^{-1}$ (OH), at 3,400 cm$^{-1}$ (NH) at 1,295 cm$^{-1}$ and 1,120 cm$^{-1}$(SO$_2$) and at 1,045 cm$^{-1}$ (C-O).

EXAMPLE 3

This example was run to demonstrate the criticality of the ratio of the Type II to Type I chain extender compounds in making a high resiliency polyurethane foam structure in the conventional formulation described above. Various binary mixtures of a Type II and a Type I compound, from 100 mole percent of Type II to 50 mole percent of Type II were evaluated in the foam forming formulation. The Type II compound was 1,2,3,4,4a,5,7,7a-octahydrothieno[3,4-b]pyrazine-1,4-bis-($\alpha$-methylethanol) 6,6-dioxide and the Type I compound was 1,2,3,4,4a,5,7,7a-octahydrothieno[3,4-b]pyrazine-1-($\alpha$-methylethanol) 6,6-dioxide. These compounds were made using the procedure given in copending application of Nudenberg et al. referred to above. The results are tabulated in Table I.

Table I

| Mole % of Type II | Mole % of Type I | Quality of Foam Structure |
|---|---|---|
| 100 | 0 | Completely blown; completely collapsed |
| 90 | 10 | Completely blown; partially collapsed |
| 80 | 20 | Completely blown; uniform structure |
| 70 | 30 | Completely blown; uniform structure |
| 60 | 40 | Incompletely blown; premature gelation |
| 50 | 50 | Incompletely blown; fast premature gelation |
| 0 | 100 | Very little blow; porous elastomer |

From the Table I, it will be apparent that satisfactory foams may be prepared by using a mixture of the two novel Type II and Type I chain extender compounds when the mole percent ratio of Type II to Type I is from about 80/20 to about 70/30. When used alone neither the Type II compound nor the Type I compound produce an acceptable foam structure, the Type II being too slow and the Type I being too fast. Only the mixture of the two types of chain extender compounds within a certain composition provides the proper balance of gas formation (rise time) and chain extension plus crosslinking (gel time).

EXAMPLE 4

The binary chain extender mixtures from Examples No. 1 and No. 2 were evaluated in the conventional high resiliency "one-shot" foam formulation. For comparison purposes, the most widely used chain extender 4,4'-methylene bis(o-chloroaniline), which is commonly designated by the code letters MOCA (not a trademark), was also run. The formulations and results are tabulated in Table II.

Table II (all parts are by weight)

| Material | Formulations | | | |
|---|---|---|---|---|
| | A | B | C | D |
| Polyol 4701 (as above) | 100.0 | 100.0 | 100.0 | 100.0 |
| MOCA | 4.0 | — | — | — |
| Example 1 chain extender | — | — | 5.0 | 5.0 |
| Example 2 chain extender | — | 5.0 | — | — |
| T-23P (as above) | 3.0 | 5.0 | 3.0 | 3.0 |
| Water | 3.6 | 2.5 | 2.5 | 3.5 |
| "Dabco 33LV" (as above) | 0.5 | 0.4 | 0.6 | 0.6 |
| NEM (as above) | 0.75 | 1.0 | — | — |
| "Niax A-1" (as above) | 0.15 | 0.20 | — | — |
| Stannous octoate | — | — | 0.06 | 0.18 |
| "DC 200" (as above) | 0.05 | 0.02 | 0.03 | 0.03 |
| TDI (as above) | 47.3 | 36.0 | 34.5 | 44.5 |
| TDI Index | 110 | 110 | 105 | 105 |

| Determination | Results and Properties of Foam Structure | | | |
|---|---|---|---|---|
| | A | B | C | D |
| Rise Time (seconds) | 95 | 90 | 107 | 100 |
| Density (lbs./cu.ft.) | 2.1 | 2.47 | 2.69 | 2.11 |
| Tensile (lbs./sq.in.) | 17.5 | 17.1 | 21.7 | 18.6 |
| Tear (lbs./lin. in.) | 1.76 | 2.50 | 3.45 | 3.12 |
| Elongation, % | 215 | 230 | 280 | 240 |
| "Sag" Factor | 3.0 | 3.1 | 3.2 | 3.3 |

From Table II it will be seen that formulations B, C and D, which represent the invention, had a rise time comparable with formulation A which used the well-known chain extender "MOCA," and yielded foam products which had greatly enhanced tear strength and elongation as compared to formulation A, equivalent "sag" factor, and density and tensile strength values fairly comparable with those of the product of formulation A.

In addition the chain extenders of the present invention are free from carcinogenic activity. In contrast, there have been some indications that "MOCA" may be carcinogenic. If those indications prove to be justified, the present invention will offer a still further practical advantage in addition to the advantages described in the foregoing.

While the invention has been described with particular reference to the preparation of polyurethane foams by a technique involving the use of water which, in accordance with well-known principles, causes foaming as a result of reaction with a portion of the polyisocyanate and consequent liberation of carbon dioxide which is retained in the form of bubbles, it is not limited thereto but can be practiced using other polyurethane foam-forming techniques such as those which depend at least in part upon the use of a readily volatilizable inert mechanical blowing agent, particularly a fluorocarbon. If desired, water and a fluorocarbon or the like can be used in conjunction with one another to effect foaming.

We claim:
1. Polyurethane foam made from the reaction products, made in the presence of a blowing agent of a polyalkylene polyether polyol having a hydroxylic functionality of at least two, an organic polyisocyanate and a chain extender comprising a major amount of a compound having the formula:

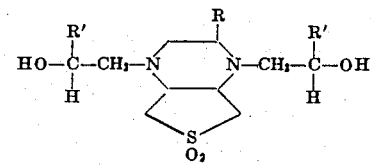

where R, R' and R'' may be the same or different and represent a hydrogen atom or a lower alkyl group having 1 to 8 carbon atoms, and
a minor amount of a compound having the formula:

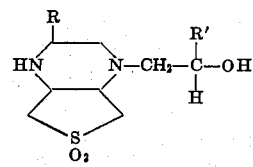

where R and R' may be the same or different and represent a hydrogen atom or a lower alkyl group having 1 to 8 carbon atoms.

2. Polyurethane foam as defined in claim 1 wherein the mole ratio of the first-mentioned compound to the second-mentioned compound is from 1.5:1 to 9:1.

3. Polyurethane foam as defined in claim 1 wherein the mole ratio of the first-mentioned compound to the second-mentioned compound is from 2:1 to 4.5:1.

4. Polyurethane foam as defined in claim 1 wherein the mole ratio of the first-mentioned compound to the second-mentioned compound is about 4:1.

5. Polyurethane foam as defined in claim 1 wherein the first-mentioned compound is 1,2,3,4,4a,5,7,7a-octahydrothieno[3,4-b]pyrazine-1,4-bis-(α-methylethanol) 6,6-dioxide and the second-mentioned compound is 1,2,3,4,4a-5,7,7a-octahydrothieno[3,4-b]pyrazine-1-(α-methylethanol) 6,6-dioxide.

6. Polyurethane foam as defined in claim 5 wherein the mole ratio of the first-mentioned compound to the second-mentioned compound is from 1.5:1 to 9:1.

7. Polyurethane foam as defined in claim 5 wherein the mole ratio of the first-mentioned compound to the second-mentioned compound is from 2:1 to 4.5:1.

8. Polyurethane foam as defined in claim 5 wherein the mole ratio of the first-mentioned compound to the second-mentioned compound is about 4:1.

9. In a one-shot process for making polyurethane foam wherein a polyalkylene polyether polyol having a hydroxylic functionality of at least two, an organic polyisocyanate and a chain extender are simultaneously mixed together, in the presence of a blowing agent the improvement wherein said chain extender comprises a major amount of a compound having the formula:

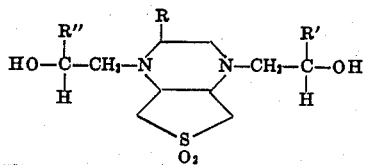

where R, R' and R'' may be the same or different and represent a hydrogen atom or a lower alkyl group having 1 to 8 carbon atoms, and
a minor amount of a compound having the formula

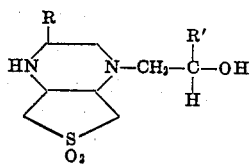

where R and R' may be the same or different and represent a hydrogen atom or a lower alkyl group having 1 to 8 carbon atoms.

10. A process as defined in claim 9 wherein the mole ratio of the first-mentioned compound to the second-mentioned compound is from 1.5:1 to 9:1.

11. A process as defined in claim 9 wherein the mole ratio of the first-mentioned compound to the second-mentioned compound is from 2:1 to 4.5:1.

12. A process as defined in claim 9 wherein the mole ratio of the first-mentioned compound to the second-mentioned compound is about 4:1.

13. A process as defined in claim 9 wherein the first-mentioned compound is 1,2,3,4,4a,5,7,7a-octahydrothieno[3,4-b]pyrazine-1,4-bis-(α-methylethanol) 6,6-dioxide and the second-mentioned compound is 1,2,3,4,4a,5,7,7a-octahydrothieno[3,4-b]pyrazine-1-(α-methylethanol) 6,6-dioxide.

14. A process as defined in claim 13 wherein the mole ratio of the first-mentioned compound to the second-mentioned compound is from 1.5:1 to 9:1.

15. A process as defined in claim 13 wherein the mole ratio of the first-mentioned compound to the second-mentioned compound is from 2:1 to 4.5:1.

16. A process as defined in claim 13 wherein the mole ratio of the first-mentioned compound to the second-mentioned compound is about 4:1.

* * * * *